United States Patent
Pietrasik

(10) Patent No.: US 7,920,137 B2
(45) Date of Patent: Apr. 5, 2011

(54) RGV DISPLAY SYSTEM

(76) Inventor: John Pietrasik, Clarkston, MI (US)

(*) Notice: Subject to any disclaimer, the term of this patent is extended or adjusted under 35 U.S.C. 154(b) by 990 days.

(21) Appl. No.: 11/786,014

(22) Filed: Apr. 10, 2007

(65) Prior Publication Data

US 2008/0252580 A1    Oct. 16, 2008

(51) Int. Cl.
*G09G 5/00* (2006.01)

(52) U.S. Cl. ........... 345/207; 345/102; 345/83; 345/77; 345/204; 315/169.3

(58) Field of Classification Search .......... 345/207, 345/82–83, 76–78, 690–691, 102, 214; 315/169.3; 348/271–273, 277–279; 313/463
See application file for complete search history.

(56) References Cited

U.S. PATENT DOCUMENTS

| | | | |
|---|---|---|---|
| 5,270,536 A | 12/1993 | Malhotra | |
| 5,965,875 A | 10/1999 | Merrill | |
| 6,600,562 B1 | 7/2003 | Chang | |
| 6,628,248 B2 * | 9/2003 | Masumoto et al. | 345/32 |
| 6,771,314 B1 | 8/2004 | Bawolek et al. | |
| 6,873,339 B2 | 3/2005 | Ohsawa et al. | |
| 7,317,403 B2 * | 1/2008 | Grootes et al. | 340/815.45 |
| 2004/0100437 A1 * | 5/2004 | Hunter et al. | 345/102 |
| 2004/0135750 A1 * | 7/2004 | Ishiguchi | 345/83 |
| 2005/0200578 A1 * | 9/2005 | Lee et al. | 345/82 |
| 2006/0125770 A1 * | 6/2006 | Kao et al. | 345/102 |
| 2006/0145593 A1 * | 7/2006 | Yoshino et al. | 313/487 |
| 2007/0080923 A1 * | 4/2007 | Enomoto et al. | 345/102 |

* cited by examiner

*Primary Examiner* — Lun-Yi Lao
(74) *Attorney, Agent, or Firm* — Dickinson Wright, PLLC; Harold W. Milton, Jr.

(57) ABSTRACT

A color display system includes a sensor assembly having a plurality of sensor pixels for sensing incident light. Each of the sensor pixels generates a photocurrent in response to sensing the incident light. An image processor being in communication with the sensor assembly receives each of the photocurrents and computes a plurality of photocurrent values with each of the photocurrent values corresponding to one of the photocurrents. A display processor receives each of the photocurrent values and calculates a plurality of power values based on the photocurrent values. The color display system further includes a display driver that receives each of the power values and that generates a plurality of power signals having a power corresponding to one of the power values. A display device includes a plurality of light emitting devices being powered by the power signals for emitting light. The light emitting devices include at least one deep-violet light emitting device for emitting deep-violet light.

17 Claims, 3 Drawing Sheets

RGV DISPLAY SYSTEM

BACKGROUND OF THE INVENTION

1. Field of the Invention

The subject invention relates to a color display system for reproducing colors of incident light.

2. Description of the Prior Art

The ability of the human eye to distinguish color results from stimulating three types of retinal receptors, i.e. cones, contained within the retina of the eye. The three types of cones contained in the eye are typically referred to as L-cones, M-cones, and S-cones. Each of the three types of cones is responsive to a specific wavelength range. For example, L-cones have a peak sensitivity in the orange region of the visible spectrum. M-cones have a peak sensitivity in the green region of the visible spectrum. S-cones have a peak sensitivity in the blue region of the visible spectrum. The various wavelengths of light stimulate the cones, which cause each cone to generate an electrical impulse. The electrical impulses are combined and are communicated to the brain via the optic nerve. Based on the electrical impulses, the brain distinguishes the color of light received through the eye.

Color display systems are used to reproduce the colors of images. Traditional color display systems include image sensors having red, green and blue sensor pixels that sense red, green and blue incident light, respectively. The sensor pixels can be arranged in a vertical relationship with one another, as disclosed in U.S. Pat. No. 5,965,875 to Merrill, or the sensor pixels may be disposed in a horizontal arrangement with one another, as disclosed in U.S. Pat. No. 3,971,065 to Bayer. Each sensor pixel delivers a signal to a color display module. The color display module emits light intended to reproduce the colors sensed by the sensor pixels. The color display system includes a plurality of light emitting devices for emitting light. Traditional color display systems utilize red light emitting devices for emitting red light, green light emitting devices for emitting green light, and blue light emitting devices for emitting blue light. Red light has a wavelength of about 630 nm, green light has a wavelength of about 525 nm, and blue light has a wavelength of about 470 nm. Although an arrangement of red, green, and blue light emitting devices can produce light having a wide range of colors, such a choice of wavelengths limits the range of color that can actually be reproduced. Accordingly, light having a wavelength being less than 470 nm and light having a wavelength being more than 630 nm can not be accurately reproduced. In addition, an image sensor having red, green, and blue pixel sensors can not accurately represent the response of the cones.

SUMMARY OF THE INVENTION AND ADVANTAGES

A color display system for reproducing the color of an image is presented including a plurality of light emitting devices for emitting light. The invention includes a display device including at least one deep-violet light emitting device for emitting deep-violet light. By including a deep-violet light emitting device, light having a wavelength less than 470 nm, including deep-violet light, can be reproduced.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 3:
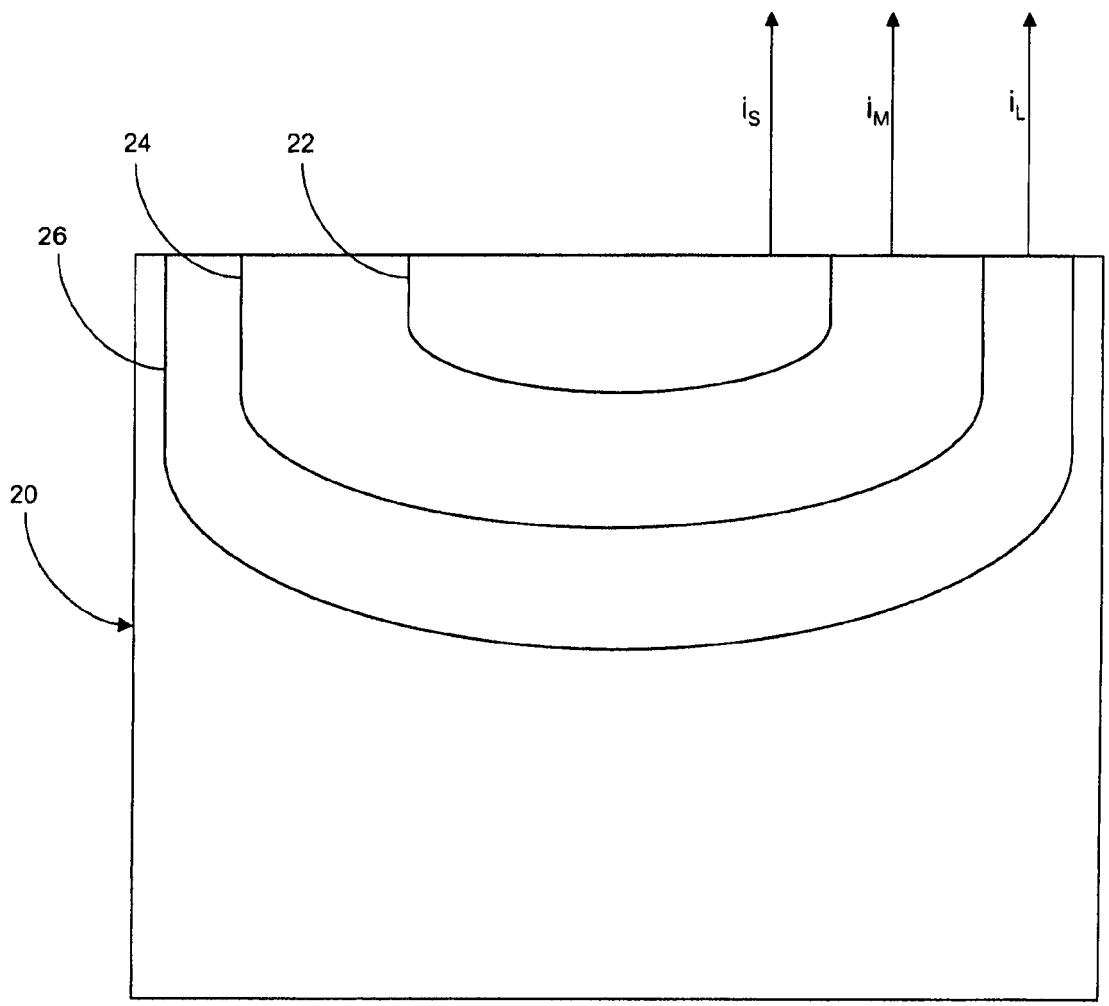
FIG. 3 is a perspective view of an orange sensor pixel, a green sensor pixel, and a blue sensor pixel disposed in vertical arrangement with one another.

Referring to the Figures, wherein like numerals indicate corresponding parts throughout the several views, a color display system is illustrated including a sensor assembly 20 having a plurality of sensor pixels 22, 24, 26 for sensing incident light. The sensor assembly 20 includes a plurality of blue, green, and orange sensor pixels 22, 24, 26. The blue sensor pixels 22 sense blue incident light with each of the blue sensor pixels 22 generating a short wavelength photocurrent ($i_S$) in response to sensing the blue incident light. The green sensor pixels 24 sense green incident light with each of the green sensor pixels 24 generating a medium wavelength photocurrent ($i_M$) in response to sensing the green incident light. The orange sensor pixels 26 sense orange incident light with each of the orange sensor pixels 26 generating a long wavelength photocurrent ($i_L$) in response to sensing the orange incident light. In an exemplary embodiment illustrated in FIG. 3, the sensor pixels 22, 24, 26 are arranged in a vertical alignment with each other. Specifically, each of the green sensor pixels 24 are disposed above one of the orange sensor pixels 26 and each of the blue sensor pixels 22 are disposed above one of the green sensor pixels 24.

The color display system further includes an image processor 28 being in communication with the sensor assembly 20 for receiving one of the short wavelength photocurrents ($i_S$), one of the medium wavelength photocurrents ($i_L$), and one of the long wavelength photocurrents ($i_L$). The short ($i_S$), medium ($i_L$), and long photocurrents ($i_L$) are used to compute a plurality of short photocurrent values, medium photocurrent values, and long photocurrent values. In one embodiment the image processor 28 may compute interpolated photocurrent values to be saved to and read from an image memory device 30. The interpolated photocurrent values are mathematical combinations of directly received photocurrent values from the sensor assembly 20 having a configuration such as that disclosed in U.S. Pat. No. 3,971,065 by Bayer. Alternatively, the image processor may calculate a specific photocurrent value directly from each photocurrent generated by each sensor pixel. Specifically, each short photocurrent value corresponds to one of the short photocurrents ($i_S$), each medium photocurrent value corresponds to one of the medium photocurrents ($i_L$), and each long photocurrent value corresponds to one of the long photocurrents ($i_L$). As discussed above, an image memory device 30 may be utilized with the color display for storing the photocurrent values. The image memory device 30 is in communication with the image processor 28 for saving and reading the photocurrent values to and from the image memory device 30.

The color display system further includes a display processor 32 being in communication with the image processor 28. The display processor 32 is preprogrammed with the formulas:

$$S_S(\lambda_L)P_L + S_S(\lambda_L)P_M + S_S(\lambda_S)P_S = i_S$$

$$S_M(\lambda_L)P_L + S_M(\lambda_L)P_M + S_M(\lambda_S)P_S = i_M$$

$$S_L(\lambda_L)P_L + S_L(\lambda_L)P_M + S_L(\lambda_S)P_S = i_L,$$

wherein $S_S(\lambda)$ is the sensitivity function of the blue sensor pixels (22), wherein $S_M(\lambda)$ is the sensitivity function of the green sensor pixels (24), wherein $S_L(\lambda)$ is the sensitivity function of the orange sensor pixels (26), wherein $\lambda_L$ is the wavelength of the deep-red light emitting device (40), wherein $\lambda_M$ is the wavelength of the green light emitting device (42), and wherein $\lambda_S$ is the wavelength of the deep-violet light emitting device (44).

The formulas stated above are color matching formulas that determine the radiometric power levels ($P_S$, $P_M$, $P_L$) required for a given set of primary light sources for emitting light to produce the same visual response as a known incident spectrum. The most appropriate primary wavelengths ($\lambda_S$, $\lambda_M$, $\lambda_L$) are those which ideally stimulate only one cone type per primary. If it is not possible to stimulate only cone type, then the values of the primaries ($\lambda_S$, $\lambda_M$, $\lambda_L$) should be chosen so as to minimize the total radiometric power contribution to the other cone types. Further, the primaries ($\lambda_S$, $\lambda_M$, $\lambda_L$) should chosen such that required radiometric power levels ($P_S$, $P_M$, $P_L$) needed to stimulate the respective cone types in the retina are at levels which are safe to the human eye. With the above criteria in mind, it is desirable that the S-cone primary ($\lambda_S$) should be chosen to be deep-violet (around 400 nm), the M-cone primary ($\lambda_M$) should be chosen to be green (around 525 nm), and the L-cone primary ($\lambda_L$) should be chosen to be deep-red (around 700 nm).

The display processor 32 is in communication with the image processor 28 for receiving the photocurrent values and for calculating a short power value ($P_S$), a medium power value ($P_M$), and a long power value ($P_L$) based on the formulas stated above. A frame buffer 34 may be utilized in communication with the display processor 32 for storing the power values and for sending the power values to and from the display processor 32.

The color display system further includes a display driver 36 being in communication with the display processor 32 for reading the power values. Based on the power values, the display driver 36 generates a short power signal ($P_S$) having a power of the short power value, a medium power signal ($P_L$) having a power of the medium power value, and a long power signal ($P_L$) having a power of the long power value.

A display device 38 is in communication with the display driver 36. The display devices 38 includes a plurality of deep-red light emitting devices 40, a plurality of green light emitting devices 42, and a plurality of deep-violet light emitting devices 44. The light emitting devices 40, 42, 44 include deep-red, green, and deep-violet light emitting diodes 40, 42, 44 for emitting deep-red, green, and deep-violet light, respectively. Additionally, the light emitting devices 40, 42, 44 may include deep-red, green, and deep-violet laser light sources 40, 42, 44, including, but not limited to laser diodes and organic light emitting diodes, for emitting deep-red, green, and deep-violet laser light, respectively. The power signals ($P_S$, $P_M$, $P_L$) generated by the display driver 36 power the light emitting devices 40, 42, 44. Specifically, the short power signal ($P_S$) powers one of the deep-violet light emitting devices 44, the medium power signal ($P_M$) powers one of the green light emitting devices 42, and the long power signal ($P_L$) powers one of the deep-red light emitting devices 40. A light intensity controller 46 may be utilized in communication with the display driver 36 for numerically adjusting the power values. By varying the numerical power values, the brightness of the light emitted by the light emitting devices 40, 42, 44 can be adjusted.

Figure 1:
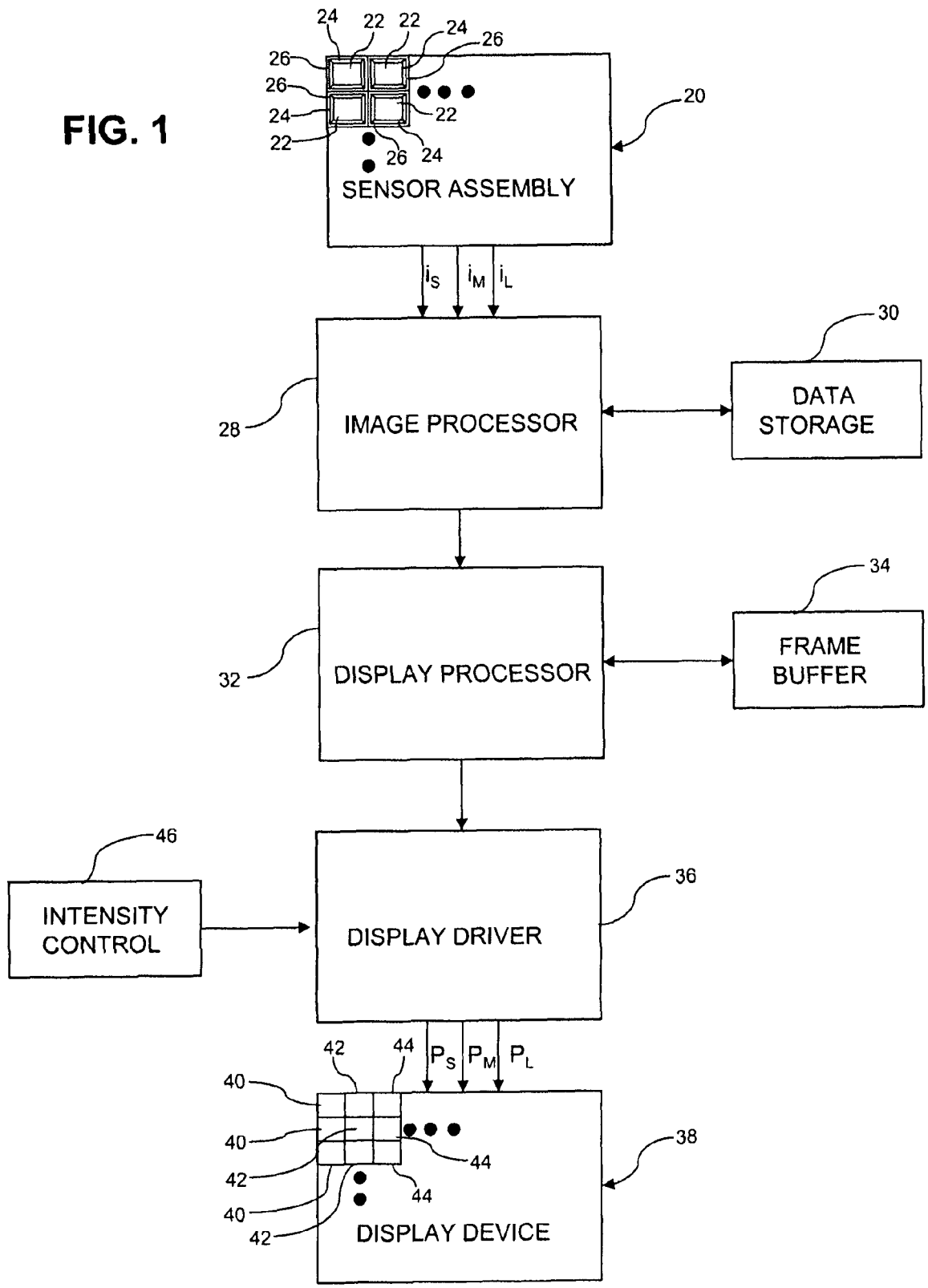
FIG. 1 is a block diagram of a color display for reproducing color of an image according to the present invention.
Figure 2:
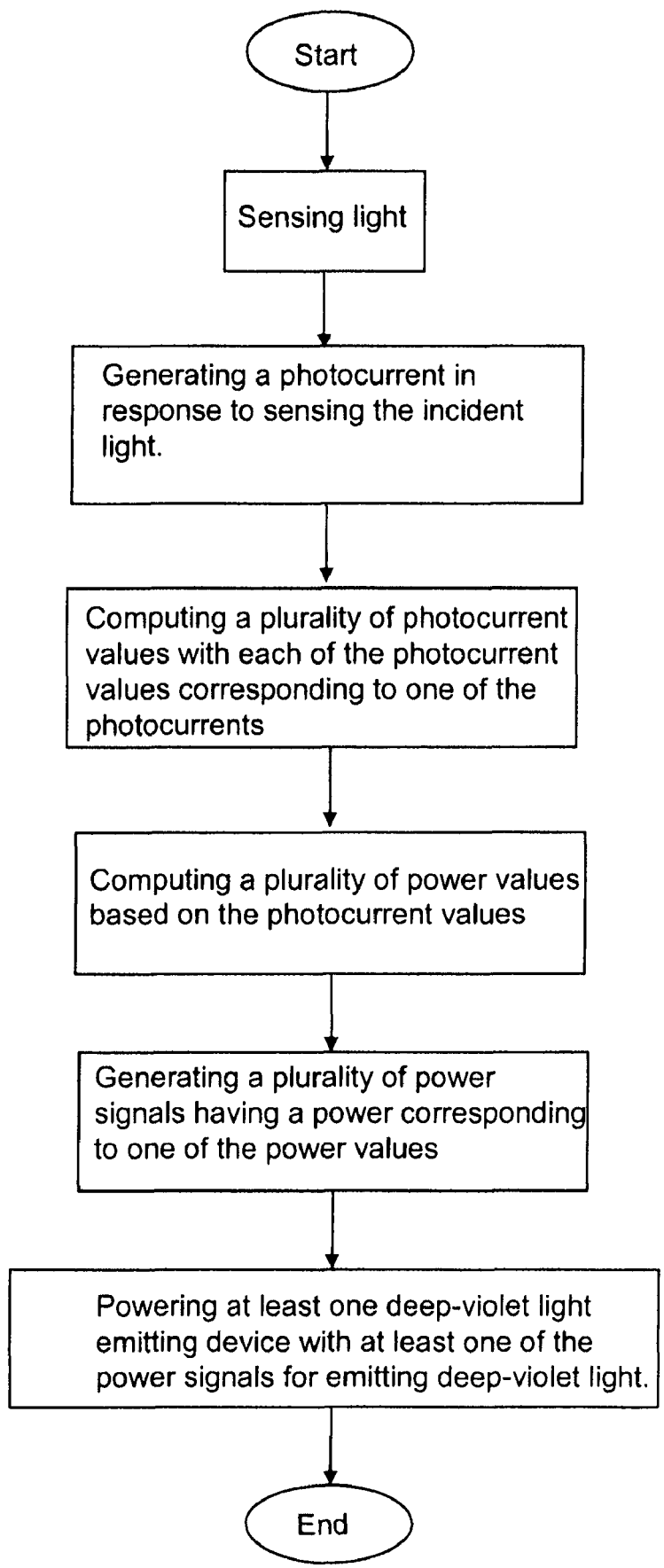
FIG. 2 is a flow chart illustrating a method for reproducing color of an image.

FIG. 2 illustrates a method for reproducing the color of an image. The method begins by sensing incident light. A sensor assembly 20 having sensor pixels 22, 24, 26 can be used to sense short wavelengths of light with a peak sensitivity in the blue region of the visible spectrum, medium wavelengths of light with a peak sensitivity in the green region of the visible spectrum, and long wavelengths of light with a peak sensitivity in the orange region of the visible spectrum. The method continues by generating a plurality of photocurrents in response to sensing the incident light. For example, each sensor pixel 22, 24, 26 can generate a photocurrent ($i_S$, $i_M$, $i_L$) indicative of corresponding light sensed by the sensor pixel 22, 24, 26. The method proceeds by computing a plurality of photocurrent values with each of the photocurrent values corresponding to one of the photocurrents ($i_S$, $i_M$, $i_L$). The method continues by computing a plurality of power values based on the photocurrent values. The method continues by generating a plurality of power signals having a power corresponding to one of the power values. The power signals include a short power signal ($P_S$), a medium power signal ($P_M$) and a long power signal ($P_L$). The method proceeds by powering at least one deep-violet light emitting device (44) with one of the short power signals ($P_S$) for emitting deep-violet light. The method further includes powering at least one green light emitting device (42) with one of the medium power signals ($P_M$) for emitting green light, and at least one deep-red light emitting device (40) with one of the long power signals ($P_L$) for emitting deep-red light before the method ends. By modeling the retina of the human eye as an equivalent array of semiconductor photodiode elements, an optimum set of monochromatic primary sources can be determined by the equations provided above. Accordingly, a display having an optimal color gamut can be constructed for reproducing a wide range of incident light, including deep-violet light having a wavelength of about 400 nm and deep-red light having a wavelength of about 700 nm.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. In addition, the reference numerals in the claims are merely for convenience and are not to be read in any way as limiting.

ELEMENT LIST

| Element Symbol | Element Name |
| --- | --- |
| 20 | sensor assembly |
| 22 | blue sensor pixels |
| 24 | green sensor pixels |
| 26 | orange sensor pixels |
| 28 | image processor |
| 30 | image memory device |
| 32 | display processor |
| 34 | frame buffer |
| 36 | display driver |
| 38 | display device |
| 40 | deep-red light emitting device |
| 42 | green light emitting device |
| 44 | deep-violet light emitting device |
| 46 | light intensity controller |

What is claimed is:

1. A color display system comprising;
   a sensor assembly (20) having a plurality of sensor pixels (22, 24, 26) for sensing incident light and for generating a photocurrent in response to sensing the incident light,
   an image processor (28) being in communication with said sensor assembly (20) for receiving each of the photocurrents and for computing a plurality of photocurrent values with each of the photocurrent values corresponding to at least one of the photocurrents,
   a display processor (32) being in communication with said image processor (28) for receiving each of the photocurrent values and for calculating a plurality of power values based on the photocurrent values,
   a display driver (36) being in communication with said display processor for receiving each of the power values and for generating a plurality of power signals having a power corresponding to one of the power values,
   a display device (38) being in communication with said display driver (36) and having a plurality of light emitting devices (40, 42, 44) being powered by said power signals for emitting light, and characterized by
   said light emitting devices (40, 42, 44) of said display device including at least one deep-violet light emitting device (44) for emitting deep-violet light and at least one green light emitting device (42) for emitting green light and at least one deep-red light emitting device (40) for emitting deep-red light,
   said plurality of power signals including at least one short power signal ($P_S$) for powering at least one of said deep-violet light emitting devices (44) and at least one medium power signal ($P_M$) for powering at least one of said green light emitting devices (42) and at least one long power signal ($P_L$) for powering at least one of said deep-red light emitting devices (40),
   said plurality of sensor pixels (22, 24, 26) including a blue sensor pixel (22) for sensing blue incident light and for generating a short wavelength photocurrent ($i_S$) in response to sensing the blue incident light and a green sensor pixel (24) for sensing green incident light and for generating a medium wavelength photocurrent ($i_M$) in response to sensing the green incident light and an orange sensor pixel (26) for sensing orange incident light and for generating a long wavelength photocurrent ($i_L$) in response to sensing the orange incident light, and
   wherein said display processor (32) calculates the short power value ($P_S$) and the medium power value ($P_M$) and the long power value ($P_L$) according to the formulas:

$$S_S(\lambda_L)P_L + S_S(\lambda_M)P_M + S_S(\lambda_S)P_S = i_S,$$

$$S_M(\lambda_L)P_L + S_M(\lambda_M)P_M + S_M(\lambda_S)P_S = i_M,$$

$$S_L(\lambda_L)P_L + S_L(\lambda_M)P_M + S_L(\lambda_S)P_S = i_L,$$

wherein $S_S(\lambda)$ is the sensitivity function of the blue sensor pixels (22),
   wherein $S_M(\lambda)$ is the sensitivity function of the green sensor pixels (24),
   wherein $S_L(\lambda)$ is the sensitivity function of the orange sensor pixels (26),
   wherein $\lambda_L$ is the wavelength of the deep-red light emitting device (40),
   wherein $\lambda_M$ is the wavelength of the green light emitting device (42), and
   wherein $\lambda_S$ is the wavelength of the deep-violet light emitting device (44).

2. The display system of claim 1 further comprising an image memory device (30) being in communication with said image processor (28) for storing at least one of the short, medium, and long photocurrent values.

3. The display system of claim 1 further comprising a frame buffer (34) in communication with said display processor (32) for storing at least one of the short, medium, and long power values.

4. The display system of claim 1 further comprising a light intensity controller (46) in communication with said display driver (36) for numerically adjusting the value of the short, medium, and long power values to vary the brightness of said deep red, green, and deep-violet light emitting devices (40, 42, 44).

5. The display system of claim 1 wherein each of said green sensor pixels (24) is disposed above one of said orange sensor pixels (26) and each of said blue sensor pixels (22) is disposed above one of said green sensor pixels (24).

6. The display system of claim 1 wherein said display processor (32) is preprogrammed with said formulas for calculating the short power value ($P_S$) and the medium power value ($P_M$) and the long power value ($P_L$).

7. A color display system comprising;
   a sensor assembly (20) having a plurality of blue sensor pixels (22) for sensing blue incident light,
   each of said blue sensor pixels (22) generating a short wavelength photocurrent ($i_S$) in response to sensing the blue incident light,
   said sensor assembly (20) having a plurality of green sensor pixels (24) for sensing green incident light,
   each of said green sensor pixels (24) generating a medium wavelength photocurrent ($i_M$) in response to sensing the green incident light,
   said sensor assembly (20) having a plurality of orange sensor pixels (26) for sensing orange incident light,
   each of said orange sensor pixels (26) generating a long wavelength photocurrent ($i_L$) in response to sensing the orange incident light,
   each of said green sensor pixels (24) being disposed above one of said orange sensor pixels (26) and each of said blue sensor pixels (22) being disposed above one of said green sensor pixels (24),
   an image processor (28) communicating with said sensor assembly (20) for receiving at least one of the short wavelength photocurrents and at least one of the medium wavelength photocurrents and at least one of the long wavelength photocurrents and for computing a short photocurrent value corresponding to the at least one short wavelength photocurrent and for computing a medium photocurrent value corresponding to the at least one medium wavelength photocurrent and for computing a long photocurrent value corresponding to the at least one long wavelength photocurrent,
   an image memory device (30) being in communication with said image processor (28) for storing the photocurrent values,
   said image processor (28) saving and reading the photocurrent values to and from said image memory device (30),
   a display processor (32) being in communication with said image processor (28) and being preprogrammed with the formulas:

$$S_S(\lambda_L)P_L + S_S(\lambda_M)P_M + S_S(\lambda_S)P_S = i_S,$$

$$S_M(\lambda_L)P_L + S_M(\lambda_M)P_M + S_M(\lambda_S)P_S = i_m,$$

$$S_L(\lambda_L)P_L + S_L(\lambda_M)P_M + S_L(\lambda_S)P_S = i_L,$$

wherein $S_S(\lambda)$ is the sensitivity function of the blue sensor pixels (22), wherein $S_M(\lambda)$ is the sensitivity function of the green sensor pixels (24), wherein $S_L(\lambda)$ is the sensitivity function of the orange sensor pixels (26), wherein $\lambda_L$ is the wavelength of the deep-red light emitting device (40), wherein $\lambda_M$ is the wavelength of the green light emitting device (42), and wherein $N_S$ is the wavelength of the deep-violet light emitting device (44), said display processor (32) being in communication with said image processor (28) for receiving the photocurrent values and for calculating a short power value ($P_S$) and a medium power value ($P_M$) and a long power value ($P_L$) based on said formulas, a frame buffer (34) being in communication with said display processor (32) for storing the power values and for sending the power values to and from said display processor (32), a display driver (36) being in communication with said display processor (32) for reading the power values and for generating a short power signal having a power of the short power value ($P_S$) and for generating a medium power signal having a power of the medium power value ($P_M$) and for generating a long power signal having a power of the long power value ($P_L$), a display device (38) being in communication with said display driver (36) and having a plurality of deep-red light emitting devices (40) for emitting deep-red light, said display device (38) having a plurality of green light emitting devices (42) for emitting green light, characterized by said display device (38) having a plurality of deep-violet light emitting devices (44) for emitting deep-violet light, the short power signal powering one of said deep-violet light emitting devices (44), the medium power signal powering one of said green light emitting devices (42), the long power signal powering one of said deep-red light emitting devices (40), a light intensity controller (46) being in communication with said display driver (36) for numerically adjusting the power values to vary the brightness of the light emitted by at least one of said light emitting devices (40, 42, 44).

8. The color display system of claim 7 wherein at least one of said light emitting devices (40, 42, 44) is a light emitting diode (40, 42, 44).

9. The color display system of claim 7 wherein at least one of said light emitting devices (40, 42, 44) is an organic light emitting diode (40, 42, 44).

10. The color system of claim 7 wherein at least one of said light emitting devices (40, 42, 44) is a laser light source (40, 42, 44).

11. A method for reproducing the color of an image:

sensing blue incident light and generating a short wavelength photocurrent ($i_S$) in response to sensing the blue incident light;

sensing green incident light and generating a medium wavelength photocurrent ($i_M$) in response to sensing the green incident light;

sensing orange incident light and generating a long wavelength photocurrent in response to sensing the orange incident light;

generating a plurality of photocurrents in response to sensing the incident light;

computing a plurality of photocurrent values with each of the photocurrent values corresponding to at least one of the photocurrents;

computing a plurality of power values based on the photocurrent values;

generating a plurality of power signals having a power corresponding to one of the power values including at least one short power signal ($P_S$) and at least one medium power signal ($P_M$) and at least one long power signal ($P_L$);

powering at least one deep-violet light emitting device (44) with said short power signal ($P_S$) for emitting deep violet light and powering at least one green light emitting device (42) with said medium power signal ($P_M$) for emitting green light and powering at least one deep-red light emitting device (40) with said long power signal (PO for emitting deep-red light;

calculating the short power value ($P_S$) and the medium power value ($P_M$) and the long power value ($P_L$) based on the formulas:

$$S_S(\lambda_L)P_L + S_S(\lambda_M)P_M + S_S(\lambda_S)P_S = i_S,$$

$$S_M(\lambda_L)P_L + S_M(\lambda_M)P_M + S_M(\lambda_S)P_S = i_M,$$

$$S_L(\lambda_L)P_L + S_L(\lambda_M)P_M + S_L(\lambda_S)P_S = i_L,$$

wherein $S_S(\lambda)$ is the sensitivity function of said blue sensor pixels (22), wherein $S_M(\lambda)$ is the sensitivity function of said green sensor pixels (24), wherein $S_L(\lambda)$ is the sensitivity function of said orange sensor pixels (26), wherein $\lambda_L$ is the wavelength of the deep-red light emitting device (40), wherein $\lambda$ is the wavelength of the green light emitting device (42), and wherein $\lambda_S$ is the wavelength of the deep-violet light emitting device (44).

12. The method of claim 11 further comprising storing in memory at least one of the short, medium, and long photocurrent values.

13. The method of claim 12 further comprising storing in memory at least one of the short, medium, and long power values.

14. The method of claim 13 further comprising numerically adjusting the value of the short, medium, and long power values to vary the brightness of said deep-violet, green, and deep-red light emitting devices (40, 42, 44).

15. The method of claim 11 further comprising preprogramming a display processor (32) with the formulas for calculating the short power value ($P_S$) and the medium power value ($P_M$) and the long power value ($P_L$).

16. The method of claim 11 further comprising disposing each of said green sensor pixels (24) above one of said orange sensor pixels (26) and disposing each of said blue sensor pixels (22) above one of said green sensor pixels (24).

17. A color display device comprising;

a display device (38) for communicating with a display driver (36), said display device (38) having a plurality of light emitting devices (40, 42, 44) for receiving a plurality of power signals generated by the display driver (36) to power said plurality of light emitting devices for emitting light, and characterized by said light emitting devices (40, 42, 44) of said display device (38) including at least one deep-red light emitting device (40) for emitting deep-red light and at least one green light emitting device (42) for emitting green light and at least one deep-violet light emitting device (44) for emitting deep-violet light, wherein said plurality of power signals includes at least one short power signal ($P_S$) for powering at least one of said deep-violet light emitting devices (44) and at least one medium power signal ($P_M$) for powering at least one of said green light emitting devices (42) and at least one long power signal (PO for powering at least one of said deep-red light emitting devices (40), and wherein said short power value ($P_S$) and said medium power value ($P_M$) and said long power value (PO are calculated according to the formulas:

$$S_S(\lambda_L)P_L + S_S(\lambda_M)P_M + S_S(\lambda_S)P_S = i_S,$$

$$S_M(\lambda_L)P_L + S_M(\lambda_M)P_M + S_S(\lambda_S)P_S = i_M,$$

$$S_L(\lambda_L)P_L + S_L(\lambda_M)P_M + S_L(\lambda_S)P_S = i_L,$$

wherein $S_S(\lambda)$ is the sensitivity function of the blue sensor pixels (22), wherein $S_M(\lambda)$ is the sensitivity function of the green sensor pixels (24), wherein $S_L(\lambda)$ is the sensitivity function of the orange sensor pixels (26), wherein $\lambda_L$ is the wavelength of the deep-red light emitting device (40), wherein $\lambda_M$ is the wavelength of the green light emitting device (42), and wherein $\lambda_S$ is the wavelength of the deep-violet light emitting device (44).

\* \* \* \* \*

UNITED STATES PATENT AND TRADEMARK OFFICE
CERTIFICATE OF CORRECTION

PATENT NO. : 7,920,137 B2
APPLICATION NO. : 11/786014
DATED : April 5, 2011
INVENTOR(S) : John Pietrasik It is certified that error appears in the above-identified patent and that said Letters Patent is hereby corrected as shown below:

Column 2, Line 35: "wavelength photocurrents ($i_L$)" should read -- wavelength photocurrents ($i_M$)
Column 2, Line 37: "medium ($i_L$)" should read -- medium ($i_M$)
Column 2, Line 51: "photo-currents ($i_L$)" should read -- photo-currents ($i_M$)
Column 2, Line 63: "$S_S(\lambda_L)P_L + S_S(\lambda_L)P_M + S_S(\lambda_S)P_S = i_S$" should read -- $S_S(\lambda_L)P_L + S_S(\lambda_M)P_M + S_S(\lambda_S)P_S = i_S$
Column 2, Line 65: "$S_M(\lambda_L)P_L + S_M(\lambda_L)P_M + S_M(\lambda_S)P_S = i_M$" should read -- $S_M(\lambda_L)P_L + S_M(\lambda_M)P_M + S_M(\lambda_S)P_S = i_M$
Column 2, Line 67: "$S_L(\lambda_L)P_L + S_L(\lambda_L)P_M + S_L(\lambda_S)P_S = i_L$" should read -- $S_L(\lambda_L)P_L + S_L(\lambda_M)P_M + S_L(\lambda_S)P_S = i_L$
Column 3, Line 45: "medium power signal ($P_L$)" should read -- medium power signal ($P_M$)
Column 6, Line 65: "$S_M(\lambda_L)P_L + S_M(\lambda_M)P_M + S_M(\lambda_S)P_S = i_m$" should read -- $S_M(\lambda_L)P_L + S_M(\lambda_M)P_M + S_M(\lambda_S)P_S = i_M$
Column 7, Line 11: "wherein $N_S$ is the wavelength" should read -- wherein $\lambda_S$ is the wavelength
Column 7, Line 64: "wavelength photocurrent" should read -- wavelength photocurrent ($i_M$)
Column 8, Line 16: "long power signal (PO" should read -- long power signal ($P_L$)
Column 8, Line 33: "wherein $\lambda$" should read -- wherein $\lambda_M$
Column 9, Line 6: "long power signal (PO" should read -- long power signal ($P_L$)
Column 9, Line 9: "long power value (PO" should read -- long power value ($P_L$)

Signed and Sealed this
Fourth Day of October, 2011

David J. Kappos
*Director of the United States Patent and Trademark Office*